United States Patent

[11] 3,608,984

| [72] | Inventor | Derek Robert Skoyles<br>East Grinstead, England |
|---|---|---|
| [21] | Appl. No. | 844,446 |
| [22] | Filed | July 24, 1969 |
| [45] | Patented | Sept. 28, 1971 |
| [73] | Assignee | U.S. Philips Corporation |
| [32] | Priority | Aug. 1, 1968 |
| [33] | | Great Britain |
| [31] | | 36,746/68 |

[54] RESTRICTION DEVICE FOR AN ANTILOCK BRAKE SYSTEM
5 Claims, 8 Drawing Figs.

[52] U.S. Cl. .................................................. 303/21 F,
188/181 R, 303/10, 303/61, 303/68
[51] Int. Cl. ........................................................ B60t 8/02
[50] Field of Search........................................ 303/10, 6,
21, 24, 61-63, 68-69; 188/181

[56] References Cited
UNITED STATES PATENTS

| 3,032,995 | 5/1962 | Knowles............... | 303/21 UX |
| 3,066,988 | 12/1962 | McRae.................. | 303/21 UX |
| 3,124,220 | 3/1964 | Kell....................... | 303/21 X |
| 3,286,734 | 11/1966 | Hartshorne............ | 303/21 X |
| 3,514,162 | 5/1970 | Erlebach et al........ | 303/21 |

*Primary Examiner*—Milton Buchler
*Assistant Examiner*—John J. McLaughlin
*Attorney*—Frank R. Trifari

ABSTRACT: A restriction device for use within an antilock brake system to control pressurized fluid flow to the wheel brake. A restrictor element is slidably inserted within a section of the pressure line restricting flow therethrough; variations in the extent of penetration of the slide member will determine the degree of restriction.

PATENTED SEP 28 1971

INVENTOR.
DEREK ROBERT SKOYLES

BY

Frank R. Trifari

AGENT

RESTRICTION DEVICE FOR AN ANTILOCK BRAKE SYSTEM

This invention relates to antilock brake systems for wheeled vehicles, i.e. systems designed to improve braking performance by releasing a wheel brake automatically if the wheel tends to lock on a slippery surface and then permitting further braking action without the need for any change in the action of the person using the brake. Such systems can be successful in reducing the risk of skidding due to wheel lock and maintaining directional control and can also reduce braking distances.

In one known hydraulic system the fluid must be pumped continuously so as to maintain a pressurized supply of oil for the brake, and the antilock control device bypasses some of the fluid from the brake cylinder when it is necessary to relieve the pressure therein.

There are other antilock systems which have been designed for use with hydraulic brake apparatus of the master-cylinder type, and examples of such antilock systems are described in British Pat. No. 1,101,078.

Some antilock brake systems require a restriction in a hydraulic pressure line between the pressurized fluid source and the brake. However, such a restriction in a brake line is difficult to achieve. A small aperture can be provided as a restrictor at some point along the line but the small diameters necessary make drilling difficult and, in any case, dirt tends to form blockages. If a porous plug is used there tends to be silting up after a period of time.

The present invention provides an antilock brake control system for a wheeled vehicle which system includes a hydraulic pressure line for connection from a pressurized fluid source to a wheel brake controlled by the system, and a restriction within said line which restriction comprises a slide which is movable along a section of the line and means for causing longitudinal movement of said slide in said section during operation of the system in such manner as to cause variation of the restriction.

With such a system it is possible to overcome the aforementioned problems. The restriction is now the clearance between the slide and the line section and this enables larger holes to be drilled although it does not entirely overcome blockage problems. The chance of blockage is reduced because the slide is moved along the bore thereby scouring it.

The cross section of the bore is preferably circular and constant. The slide is preferably also of circular or part-circular cross section with constant diameter (although it may have a reduced waist portion, e.g. when cooperating with a port as will be explained). A cylindrical slide may have a flat (see FIG. 1) or groove to increase the fluid path.

With a plain bore having no ports or branches (see FIG. 1) the restriction can be made variable by causing a variable length of slide to be inserted in the bore (FIG. 2). In this case the rate of change in the value of the restriction can be increased, e.g. by providing a flat (as FIG. 1) of varying depth.

Alternatively, the restriction can be made variable by causing the slide to cross an inlet port to a controlled extent (see FIG. 3) further penetration causing a longer path of restriction and eventually, if necessary, the entire bore between an inlet port and an outlet port can be occupied by the restriction slide (see FIGS. 3, 4 and 5).

Some antilock brake systems include an antilock control valve adapted for actuation by an actuator in response to sensor signals from a wheel speed reduction sensor and a connection from the brake to a reservoir which connection is adapted to be opened by said antilock control valve when the latter is actuated. In such antilock braking systems it has been found to be advantageous to control slide penetration as a function of reservoir fluid volume so that a filling of the reservoir reduces the further flow of fluid through the restriction path. Two examples of such arrangements will be described, one applied to a master-cylinder system (see FIG. 4) and one applied to a system of the continuously pumped type (see FIG. 5).

BRIEF DESCRIPTION OF THE DRAWINGS

In the drawings:

Referring now in greater detail to the figures, FIG. 2 shows a simple arrangement in which a restrictor slide 2 moves longitudinally on the bore 4 of a line 6 connecting a source of pressurized fluid to the cylinder 8 of a hydraulic brake. The slide 2 is shown projecting to a variable extent into the bore 4 and forming a variable restriction 10. The remainder of the slide 2 extends into a wider bore 12 which has a diameter which is sufficiently large to render any part of the slide 2 contained in it ineffective as a restrictor. In this arrangement the position of slide 2 is varied by applying restrictor control movements to a control rod 14 which is linked to the slide and thereby varies the effective length 2 of the restriction 10 while also scouring the bore.

Figure 1:
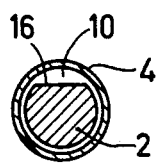
FIG. 1 is a schematic view of the restriction device according to the present invention for use in antilock brake systems.
Figure 2:
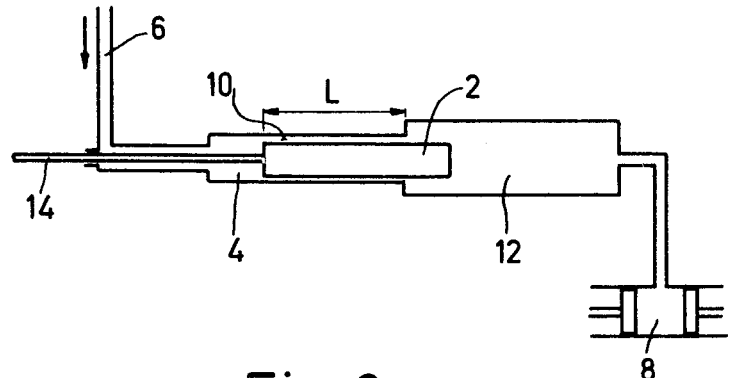
FIG. 2 is a cross-sectional view showing the restrictor slide with a flat portion.

The section of the line 6 providing the bore 4 for the restrictor slide 2 has a constant diameter and said bore is preferably circular in cross section. The cross section of the slide 2 may also be constant, in which case variation of the restriction is due entirely to variation of 2. In the case of a constant slide cross section, the latter may also be circular so that the restricted flow of fluid takes place in the clearance between the slide 2 and the bore 4. Such clearance may in practice be very small and may conveniently correspond to the normal machining tolerances used in this type of engineering. If a larger path is required for the fluid flow, it may be desirable to use the same tolerances in combination with a longitudinal groove in the bore or, preferably, a longitudinal groove or flat formed on the slide, e.g. a flat 16 as shown in FIG. 1.

Figure 3:
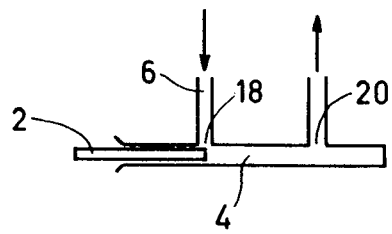
FIG. 3 is a schematic view showing an arrangement in which the restrictor slide rapidly increases restriction.

In the example of FIG. 3, the restrictor 2 is arranged to gradually obstruct an inlet port 18 connected to the source and then to continue to penetrate along the bore 4 forming part of the restrictor. When this occurs, there is a relatively rapid increase in restriction as the tip of the slide 2 passes across the inlet port 18, and this phase is followed by a further increase in restriction which is much slower and is due solely to the increasing length of bore 2 occupied by the slide 2, (for this reason the latter has, again, a constant cross section). If desired, the slide 2 may be arranged to penetrate beyond the bore 2 and obstruct the outlet port 20 connected to the brake cylinder so that, in the condition of maximum restriction the slide 2 occupies the whole of bore 2 and also the inlet and outlet ports 18 and 20 at the ends thereof.

Figure 4:
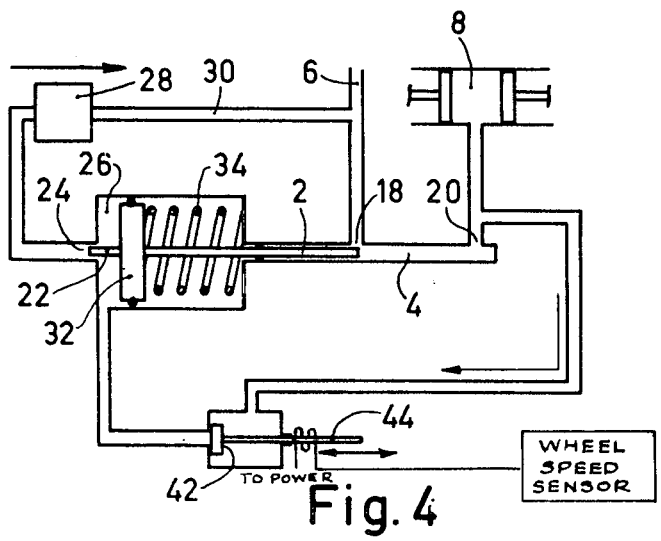
FIG. 4 is a schematic view of another arrangement of the present invention having a second restrictor slide.

The arrangement according to FIG. 4 includes an optional but advantageous addition in the form of a second restrictor slide 22 controlling the outlet 24 of a reservoir chamber 26 leading to a scavenging pump 28 and thence (preferably) back to the master cylinder by lines 30 and 6. This slide 22 is coupled to the first slide 2 and both slides are stems projecting from a piston 32 which is slidable in the reservoir chamber 26 to permit variations of fluid volume therein against a spring 34. The purpose of the second restrictor 22 is to restrict the flow of fluid to the pump so as to prevent a reduced rate of return of the variable restrictor slide 2 from a position of minimum restriction to the fully open condition. Stated in a different way, slide 22 acts as a temporary check to scavenging when the restrictor slide 2 is in the preferred position for antilock action, i.e. (as shown) partially obstructing the inlet port 18.

The second restrictor 22 of FIG. 4 (and also that of FIGS. 5 and 6) can be omitted if a restrictor is provided in the pressure fluid source or if the brakes are arranged to be applied slowly. On the other hand if a restrictor slide 22 is sued as shown in these examples, it should be designed to engage the effective entrance of its bore just when the tip of slide 2 is beginning to uncover the inlet port 18 connected to the pressure fluid source. If slide 22 is a plain cylindrical stem entering a plain bore, then the value of the restriction will rise rapidly from zero. However, other arrangements can be used to cause slide 22 to become operative, or to increase sharply in restriction value, when slide 2 approaches a preferred position for antilock operation.

Figure 5:
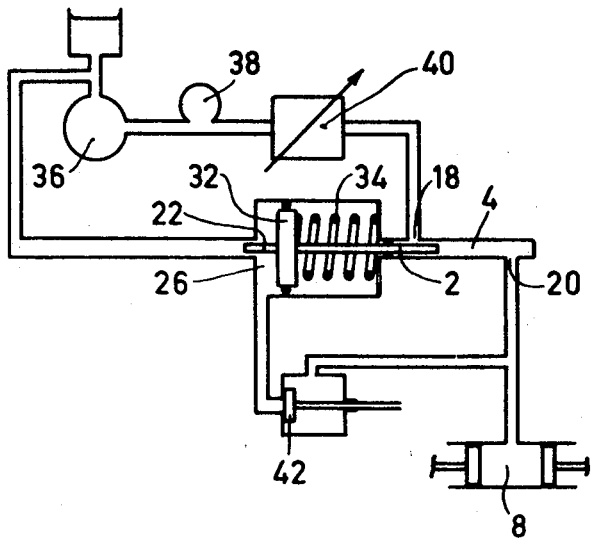
FIG. 5 is also a schematic view showing an arrangement similar to FIG. 4 but applied to a continuously running pressure pump instead of to a master cylinder.

A similar reservoir and restrictor arrangement is shown in FIG. 5 as applied to a known continuously pumped system. Again, an optional second restrictor 22 is provided for the same reasons and is coupled to the piston 32 of the reservoir 26 and to the slide 2. Again, the bore 4 cooperating with slide 2 has an inlet port 18 from a pressure source and an outlet port 20 leading to the brake cylinder 8, although in this case, of course, the pressure source is not a master cylinder. Instead, such source comprises a continuously running high pressure pump 36 followed by a pressure fluid reservoir 38 which is maintained continuously at a high pressure. The latter is followed by a modulator 40 which is actuated by the driver to provide bake pressure control.

An antilock control valve 42 is provided, as in the case of FIG. 4, and has a control rod 44 for actuation in response to antilock control signals provided by a suitable wheel speed reduction sensor and signal processing system. Such a signal processor could be a solenoid coil surrounding the rod 44 as shown in FIG. 4.

Figure 6:
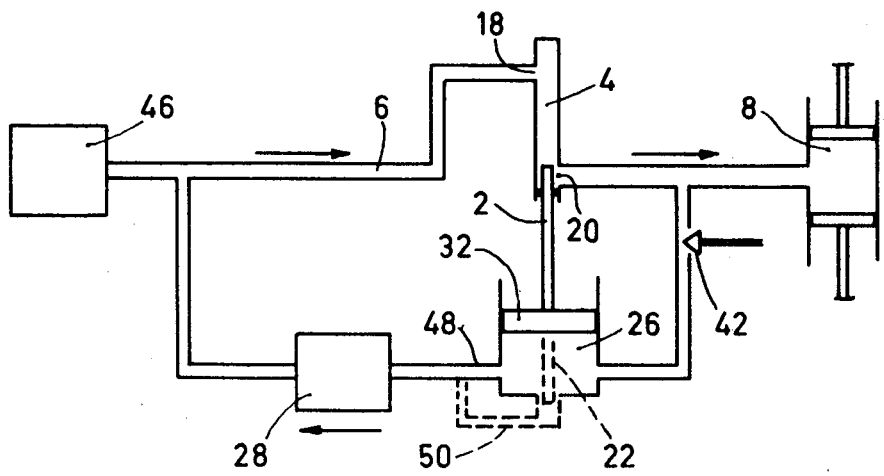
FIG. 6 is a schematic view of the arrangement shown in FIG. 4 showing a complete circuit with master cylinder.

Reverting to the system of FIG. 4, a more complete circuit corresponding to that system is shown in FIG. 6.

The same elements, restrictor slide 2 with bore 4, reservoir chamber 26, piston 32, scavenging pump 28 and control valve 4 are shown schematically together with a brake cylinder 8 and a source which, again, is a master cylinder 46. The figure shows a simple outlet 48 for the reservoir 26 for the case in which no second restrictor is used. As an optional alternative the figure shows in dotted lines an outlet 50 controlled by a second restrictor corresponding to the element 22 of FIG. 4.

The spring 34 used in the arrangement of FIG. 4 is not essential and can be omitted from the arrangements of both FIG. 4 and FIG. 6 (for this reason no spring is shown in FIG. 6).

The spring 34 normally returns the reservoir piston 32 to the normal (braking) position. A similar effect can be obtained by applying brake pressure to move the piston 32, and two examples of such an arrangement are shown in FIGS. 7 and 8 as applied to arrangements based on FIG. 4.

Figure 7:
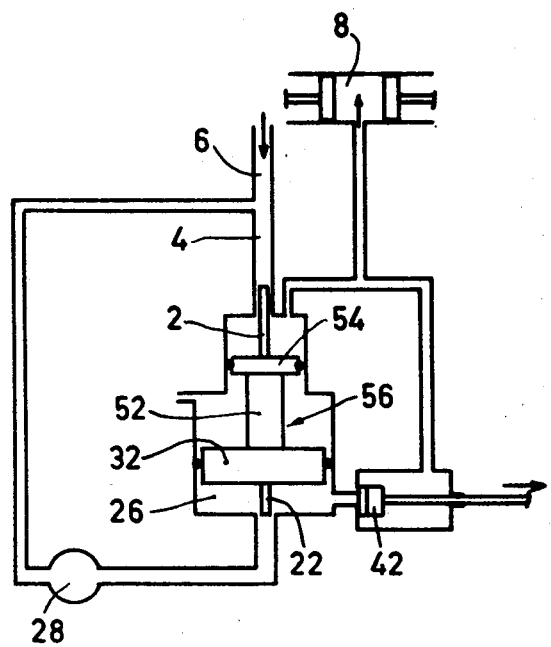
FIGS. 7 and 8 are schematic representations of two different means for controlling the braking piston of the reservoir chamber used in the arrangement of FIG. 4.

In the arrangement of FIG. 7, the piston 32 has an extension 52 carrying a second piston 54 and forms therewith a differential piston 56.

In FIG. 7, brake pressure on piston 54 forces the reservoir piston 32 downwards. On antilock, control valve 42 opens and an equal pressure appears on piston 32 and, since this is larger, the force is greater and differential piston 56 moves upwards thereby relieving brake pressure. At the end of an antilock cycle, the movement is again downward as the oil is scavenged from the reservoir 26 while the control valve 42 is closed.

Figure 8:
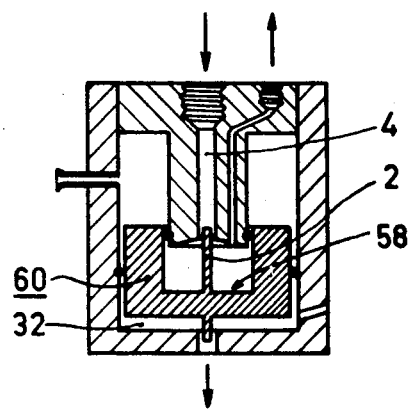

FIG. 8 shows an improved variant of the arrangement of FIG. 7. In this arrangement piston 54 is constituted by the inner face 58 of a combined differential piston 62 whereas piston 32 is constituted by the outer face 60.

In both the arrangements of FIGS. 7 and 8, no spring (or only a weak one) is needed to return piston 32 to the normal position. The arrangement of FIG. 8 has a physical length which is shorter than that of FIG. 7 and (apart from piston thicknesses etc.) has only to be twice the stroke of the reservoir.

The arrangements of FIGS. 7 and 8 differ from that of FIG. 4 in that the restrictor 2 does not extend towards a port leading to the brake line. Instead, it is only associated with the pressure line 6.

I claim:

1. An antilock brake system for a wheeled vehicle comprising a fluid pressure line for connection from a fluid pressure source to a wheel brake controlled by the system, an elongate slide member arranged for longitudinal movement into a section of said line, said member being dimensioned to provide between itself and the inner wall of the section a clearance which forms a restricted fluid path in said section, and means for varying the extent of penetration of said slide member into said section during operation of the system to cause variation of the length of said fluid path and thus of the restriction afforded by it and an antilock control valve adapted for actuation in response to an electrical output from a wheel sensor, a connection from the brake to a reservoir which connection is adapted to be opened by said antilock control valve, when the latter is actuated, to allow a fluid to be displaced from said brake through said connection into the reservoir and means for controlling slide member penetration as a function of reservoir fluid volume.

2. A system as claimed in claim 1 including a scavenging pump for scavenging fluid in said reservoir back to the fluid pressure source.

3. A system as claimed in claim 1, including a second elongate slide member which is coupled to the first and is arranged for longitudinal movement in a second section of line at an outlet of said reservoir via which connection is made to said pump, said second elongate slide member being arranged for penetration into said second section of line, or to increase sharply the extent of penetration therein, when the extent of penetration of said first slide member into the first section of line assumes a preferred restriction position for antilock operation.

4. A system as claimed in claim 3, wherein both slide members are coupled to a piston provided in the reservoir to permit changes of fluid volume therein.

5. A system as claimed in claim 1 wherein a piston is provided in the reservoir to permit changes of fluid volume therein, and wherein said piston is coupled to or combined with a second piston element of smaller area which is subject to braking fluid pressure acting in such manner as to urge the reservoir piston towards positions of lower reservoir volume.

UNITED STATES PATENT OFFICE
CERTIFICATE OF CORRECTION

Patent No. 3,608,984          Dated September 28, 1971

Inventor(s) DEREK ROBERT SKOYLES

It is certified that error appears in the above-identified patent and that said Letters Patent are hereby corrected as shown below:

Col. 3, line 8, "sued" should be --used--;

IN THE CLAIMS

Claim 3, line 1,     "claim 1" should be --claim 2--.

Signed and sealed this 5th day of December 1972.

(SEAL)
Attest:

EDWARD M. FLETCHER, JR.
Attesting Officer

ROBERT GOTTSCHALK
Commissioner of Patents